(12) United States Patent
Puri et al.

(10) Patent No.: US 11,853,904 B2
(45) Date of Patent: Dec. 26, 2023

(54) AGNOSTIC CREATION, VERSION CONTROL, AND CONTEXTUAL QUERY OF KNOWLEDGE GRAPH

(71) Applicant: Accenture Global Solutions Limited, Dublin (IE)

(72) Inventors: Colin Anil Puri, Walnut Creek, CA (US); Reymonrod Geli Vasquez, Vallejo, CA (US); Matthew Kujawinski, San Jose, CA (US); Teresa Sheausan Tung, Tustin, CA (US)

(73) Assignee: Accenture Global Solutions Limited, Dublin (IE)

( * ) Notice: Subject to any disclaimer, the term of this patent is extended or adjusted under 35 U.S.C. 154(b) by 766 days.

(21) Appl. No.: 16/831,391

(22) Filed: Mar. 26, 2020

(65) Prior Publication Data
US 2021/0304021 A1   Sep. 30, 2021

(51) Int. Cl.
| | |
|---|---|
| *G06N 5/022* | (2023.01) |
| *G06N 5/025* | (2023.01) |
| *G06F 16/901* | (2019.01) |
| *G06F 16/2458* | (2019.01) |
| *G06F 16/21* | (2019.01) |

(52) U.S. Cl.
CPC .......... *G06N 5/022* (2013.01); *G06F 16/213* (2019.01); *G06F 16/2458* (2019.01); *G06F 16/9024* (2019.01); *G06N 5/025* (2013.01)

(58) Field of Classification Search
CPC ............... G06F 16/213; G06F 16/2458; G06F 16/9024; G06N 5/022; G06N 5/02
See application file for complete search history.

(56) References Cited

U.S. PATENT DOCUMENTS

| | | | | |
|---|---|---|---|---|
| 6,061,743 | A   * | 5/2000  | Thatcher  | G06F 16/10 |
| | | | | 707/999.1 |
| 2007/0055655 | A1 * | 3/2007  | Bernstein | G06F 16/211 |
| 2016/0313934 | A1 * | 10/2016 | Isherwood | G06F 12/0646 |
| 2017/0208353 | A1 * | 7/2017  | Kim       | H04L 43/16 |
| 2019/0286676 | A1 * | 9/2019  | Fatzinger | G06F 40/56 |
| 2019/0392070 | A1 * | 12/2019 | Johnson   | G06F 16/258 |
| 2020/0242490 | A1 * | 7/2020  | Li        | G06N 5/04 |
| 2022/0129766 | A1 * | 4/2022  | Potts     | G16H 70/20 |

FOREIGN PATENT DOCUMENTS

WO     WO-2020239965 A1 * 12/2020 .......... G06F 16/219

* cited by examiner

*Primary Examiner* — Mark D Featherstone
*Assistant Examiner* — Kweku William Halm
(74) *Attorney, Agent, or Firm* — Crowell & Moring LLP

(57) ABSTRACT

A lifecycle platform for creation, ingestion, version control, and contextual query of knowledge graph is disclosed. Such a platform may be used to create and deploy a knowledge graph by reusing and merging knowledge defined in existing and validated data models. The platform tracks changes made to the knowledge graph after being deployed and provides version tracking of the knowledge graph and its underlying namespaces. The platform further provides a subscribable service for contextual viewing and query of portions and/or subset versions of the knowledge graph. Such a platform may be provided as an agnostic plugin to a specific vendor knowledge graph solution space.

20 Claims, 10 Drawing Sheets

US 11,853,904 B2

AGNOSTIC CREATION, VERSION CONTROL, AND CONTEXTUAL QUERY OF KNOWLEDGE GRAPH

TECHNICAL FIELD

This disclosure relates to knowledge graph creation, ingestion, and application.

BACKGROUND

Rapid advances in data organization and storage technologies, driven by immense customer demand, have resulted in the adoption of knowledge graphs. Knowledge graphs may represent entities with disparate characteristics and their complex relationships. Knowledge graphs may be further used to predict/infer unknown relationships between these entities. Efficient creation, ingestion, and information accesses of knowledge graphs may further facilitate their wider spread in various applications. Traditional methods and systems for creation and ingestion of knowledge graphs are static, time consuming, platform dependent, and difficult to update.

DETAILED DESCRIPTION

Figure 1:
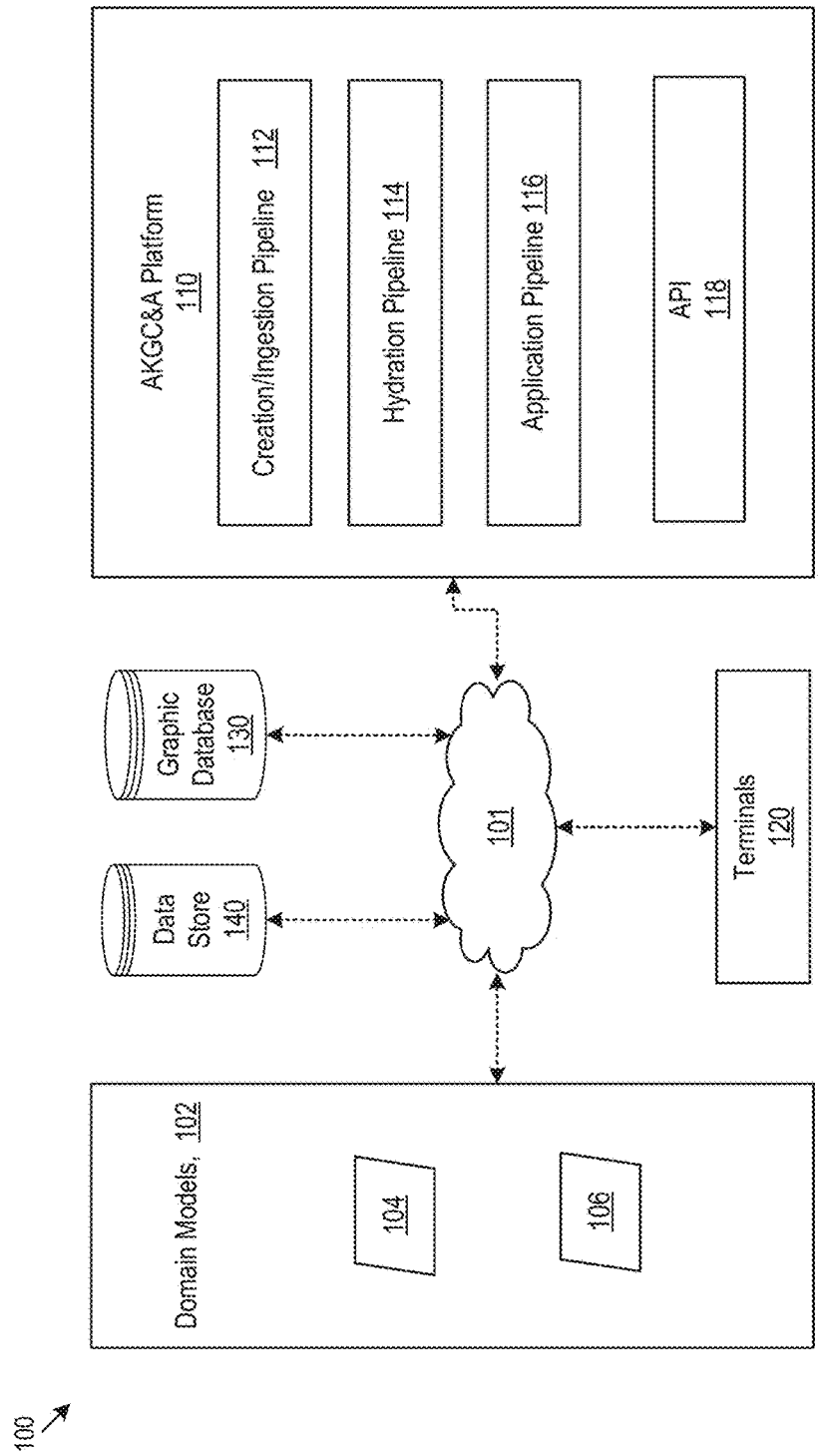
FIG. 1 shows an exemplary agnostic knowledge graph creation and application platform.

A collection of complex data items may be used for description of various sophisticated application scenarios including but not limited to industrial operations, supply chain management, enterprise operations, social network applications, and the like. These data items may include various physical or abstract entities and complex relationships there between. For example, in an industrial operation, such physical or abstract entities may include but are not limited to domain processes, facilities, equipment, sensors/sensor parameters, personnel hierarchies, supply chain entities, raw materials, intermediate products, final products, key performance measures, customers, power consumptions, emissions, and regulation compliances. Such an industrial operation may be associated with one or more of, for example, chemical synthesis, petroleum refining, semiconductor wafer fabrication, water treatment, electric power production, and the like.

Because of the disparity and complexity of these data items, a traditional relational database may not be suitable as an efficient layer for their storage and access. Instead, these data items may be defined and stored in various types of graphic databases. The collection of the data items in a graphic database may represent a graph of knowledge (alternatively referred to as a knowledge graph) encompassing a web of the various entities and relationships.

The representation of these data items may vary in different knowledge graph implementations and framework. For example, in a Labeled Property Graph (LPG) framework, various entities and relationships may be represented by nodes (or vertices) and edges, respectively. Both nodes and edges may have internal data structures in an LPG framework. For example, a node may include various characteristics of the corresponding entity including its type and its various properties. Likewise, an edge may include characteristics such as its type and a pair of types of entities it connects to. The connection may be directional or unidirectional between the pair of types of entities. For another example, in a Resource Description Framework (RDF) system or a Web Ontology Language (WOL) framework, while entities and relationships may be respectively represented by nodes/vertices and edges. these nodes/vertices and edges, unlike in the LPG framework, may each be identified by a Unique Resource Identifier (URI) as a pure label and thus may not have any internal structures.

Creation and ingestion of a knowledge graph for a particular application scenario may be based on a set of blue-print specification referred to as a schema. A schema may specify an organization of the data items, including, for examples, the types of entities and types of relationships. A schema may be designed based on data models developed for data domains relevant to the particular application. The specification of a schema may follow different forms or formats in different knowledge graph frameworks. For example, schemas from the LPG framework and the RDF framework may follow different formats and may thus be incompatible. In other words, a schema constructed in the LPG framework may not be parsed and understood by the LPG framework, and vice versa, regardless of whether they have similar underlying data model and data domains or not.

A schema in a particular framework may be materialized to generate the knowledge graph. In other words, actual entities and relationships may be based on particular constructions specified in the schema. The knowledge graph may grow as new entities and relationships are materialized according to the schema. The knowledge graph may be further processed by an artificial intelligence engine to predict unknown entities and relationships based on the entities and relationships included in the materialized knowledge graph. The knowledge graph, once created, may be queried to provide relevant information/knowledge upon user request via a user interface.

This disclosure describes agnostic creation, ingestion, hydration, and contextual application of knowledge graphs. The disclosed implementations provide a lifecycle deployment and tracking platform for knowledge graphs having functions including (1) a rapid and augmented composite data model creation of multi-domains, (2) namespace inheritance and merging from multiple namespace sources; (3) multi-facet model schema inherency and merging, (4) model and schema version control, (5) agnostic generation of an internal schema and knowledge graph for reference and tracking from source schemas in a mixture of distinct knowledge graph frameworks, (6) conversion from the internal agnostic schema to a schema in any knowledge graph framework of user choice, and (7) contextual view and query of the materialized knowledge graph. For example, the function of namespace inheritance may be provided to capture domain expertise for encapsulation of data from data models and schemas, to extract relationships between data concept from data models and schemas, and to inherit entities/relationship types and context associations from schemas. The function of merging namespaces and schema may be provided to automatically generate new schemas by combining source schemas while resolving confusion or conflicts from namespace collisions, and to determine merge point based on similarity between source models and schemas. The version control function may be provided to track changes of models or schemas that may evolve in their use and to track interpretation of their semantic information. The function of contextual views and queries of data may be provided to create data mask for generating and searching only relevant data of relevant version from the knowledge graph for users.

The knowledge graph lifecycle management platform described above and in more detail below may be implemented as a plugin to a vendor knowledge graph solution space. In other words, the disclosed platform may be embedded in the vendor knowledge graph solution space for generating a new schema and knowledge graph and ingesting the new knowledge graph into vendor tools associated with the vendor solution space. The knowledge graph in the vendor solution space may be modified in various forms after being launched. The knowledge graph lifecycle management plugin described above and in more detail below may further be configured to extract and track these changes made in the vendor solution space. The creating of the knowledge graph and tracing after its launch may be performed by the knowledge graph lifecycle management platform in an agnostic manner and independent of the vendor solution space.

In order to provide the functionalities outlined above, the exemplary architectures for the agnostic knowledge graph lifecycle deployment platform may include various data and model processing pipelines. As described in more detail below, these architectures may include a knowledge graph creation/ingestion pipeline that handles namespaces/model inheritance/merging/versioning, a knowledge graph hydration pipeline for monitoring modification in ingested knowledge graph and for providing basis information for knowledge graph versioning, and a knowledge graph application pipeline that provides interfaces for contextual searches incorporating data masks both in location in the graph and in time (version).

FIG. 1 shows a functional block diagram 100 including such an agnostic knowledge graph creation and application (AKGC&A) platform 110, alternatively referred to as a knowledge graph lifecycle management (KGLM) platform. The AKGC&A platform 110 may include a knowledge graph creation/ingestion pipeline 112, a hydration pipeline 114, and an application pipeline 116. The AKGC&A platform may communicate with various domain models and namespaces 102, including, for example, domain models 104 and 106, via network 101. The AKGC&A platform may further communicate with graphic database 130 and other data store 140 via the network 101. The graphic database may be implemented as any database system suitable for storing graphs and for providing interfaces to ingesting a graph, for intake of nodes and edges, and for performing queries and returning query results. The AKGC&A platform may additionally communicate via the network 101 with terminals 120 for operators and users to access AKGC&A platform and to use the knowledge graph. The network 101 may be implemented as any combinations of wireline and wireless communication networks. Access to the AKGC&A platform 110 may be provided by various user interfaces from the terminal 120. These user interfaces may communicate with the AKGC&A platform 110 using API 118 provided by the AKGC&A platform 110. While the graphic database 130 and the data store 140 are shown in FIG. 1 as separate components from the AKGC&A platform 110, they may be implemented as part of the AKGC&A platform 110. The graphic database 130, the data store 140, and the various computing components in the pipelines 112, 114, and 116 of the AKGC&A platform 110 may be centralized, or may alternatively be distributed, such as across a geographic region, and connected via the network 101.

The AKGC&A platform 110 may be implemented as a plugin system to a vendor solution space. As such, the platform 110 may interface with a vendor solution for ingesting the knowledge graph into a vendor tool. As such, the graphic database 130 as shown in FIG. 1 may be part of a vendor tool or vendor solution space.

Figure 2:
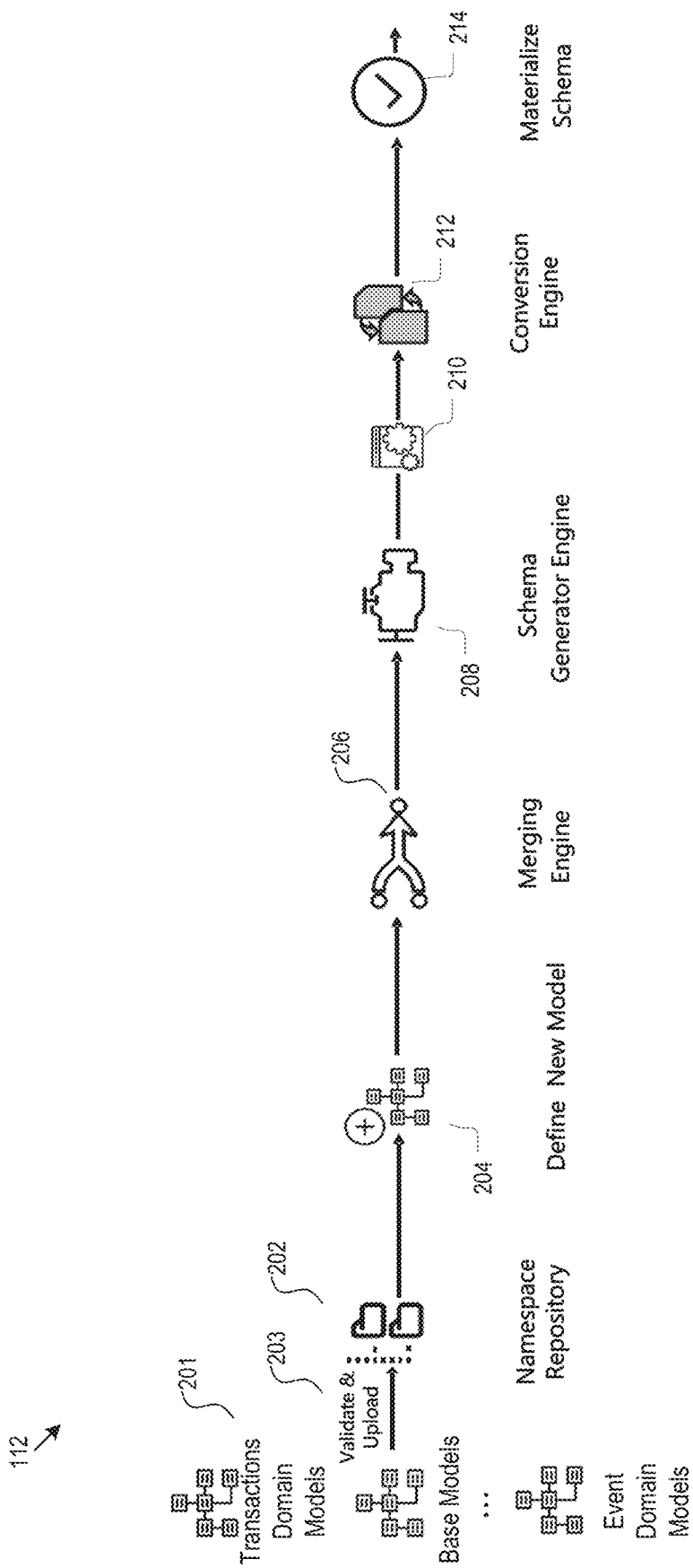
FIG. 2 shows an exemplary creation/ingestion pipeline within the agnostic knowledge graph creation and application platform of FIG. 1.

FIG. 2 illustrates an exemplary implementation of the knowledge graph creation/ingestion pipeline 112. The creation/ingestion pipeline may be responsible for processing domain data models 201 and various existing schemas associated with these domain models to generate and materialize a new schema for a new data model in a particular knowledge graph framework (e.g., LPG framework or RDF). Such a new data model represents a composite data model of the domain models.

By using the creation/ingestion pipeline 112 of FIG. 2, the AKGC&A platform 110 may not need to build a new data model completely from scratch and instead may reuse existing knowledge. For example, the AKGC&A platform 110 may rely on inheriting from other data models. These other data models may be of various types, including but not limited to existing knowledge graph schemas. Specifically, input domain data models 201 may have already been developed for various data domains, expert validated, and in existence for inheritance and automatic import by the creation/ingestion pipeline 112. These domain data models may be embedded with namespaces that are defined for the various data domains that may form the basis for the final knowledge graph at the end of the creation/ingestion pipeline 112. Such namespace embedded in each of these domain data models may include concept, entity, and relationship schemes in a single data domain or in multiple sub-domains with both intra-domain and inter-domain relationship schemes. In other words, each of the existing domain data models 201 may hierarchically include sub-data models. One or more of the domain data models 201, for example, may correspond to domain knowledge graphs and may be represented in various forms of schemas. For example, some domain data models 201 may be provided as schemas in LPG framework, whereas some other domain data models may be provided as schemas in RDF. The domain data models 201 may include other forms of models with embedded data concept, entity, and relationship constructions for different data domains. As such, the creation/ingestion pipeline 112 may combine domain data models in various sources and in disparate forms and agnostically generate a knew schema and corresponding knowledge graph.

User interface on terminal 120 may be provided for the selection of existing domain data models. One or more existing domain data models may be included as sources for the creation of a new knowledge graph by the creation/ingestion pipeline 112. Further, either an entirely or a portion of the schema of an existing knowledge graph may be inherited by the creation/ingestion pipeline 112 in generating the new knowledge graph. By partial incorporating of the schema from an existing knowledge graph, selected types of entities and relationships via the user interface may be inherited by the creation/ingestion pipeline 112 for the new knowledge graph. The creation/ingestion pipeline 112 may thus be designed to support a multi-facet inheritance of existing domain data models and schemas. The domain models 201 essentially forms a library for namespaces. Such a library may be expanded as more expert validated domain data models are collected.

As shown by 203, the creation/ingestion pipeline 112 may extract namespaces across the multiple data domains from the domain models 201 (alternatively referred to as domain data models), validate these extracted namespaces and update them to a namespace repository 202. The namespace repository 202, for example, may be part of the data store 140 in FIG. 1. The extracted namespaces may be stored and organized in the namespace repository 202 such that the source domain data models of these namespaces may be tracked.

As shown in 204, a new composite data model for the current knowledge graph to be generated by the creation/ingestion pipeline 112 may be defined based on the extracted namespaces stored in the namespace repository 202. The new composite data model may encompass the existing domain data models. In some exemplary implementations, the new composite data model may further include new concepts and relationships that may be developed from the existing namespaces and schemas of the data domain model using various machine learning algorithms. The new composite data model may represent concept, entity, and relationship constructions for data items in a space that combines the various data domains.

The creation/ingestion pipeline 112 may include a merging engine 206 and a schema generator engine 208 for resolving namespace conflict/collision and for generating a new agnostic schema based on the extracted namespaces recorded in the namespace repository 202 and the new model defined in 204. Specifically, namespaces inherited from the various data domain models may collide and, as described in more detail below in relation to FIG. 5, the merging engine may be designed to resolve these collisions. The schema generated by the schema generator engine 208 may be internally agnostic to the technology use and vendor solution space downstream.

The new agnostic schema generated by the schema generator engine 208 may be further processed into a new converted schema according to output configuration setting 210. For example, in order to materialize the schema in to a particular vendor solution space for launching of the knowledge graph, a corresponding knowledge graph framework (e.g., LPG framework or RDF) may be required. As such, the creation/ingestion pipeline 112 may include a user configurable output configuration setting 210 for specifying schema conversion format and a conversion engine 212 to convert the internally agnostic schema output from the schema generator engine 208 to a schema in an vendor solution space framework. At 214, the schema may be materialized and may be deployed into the vendor solution space.

Figure 3:
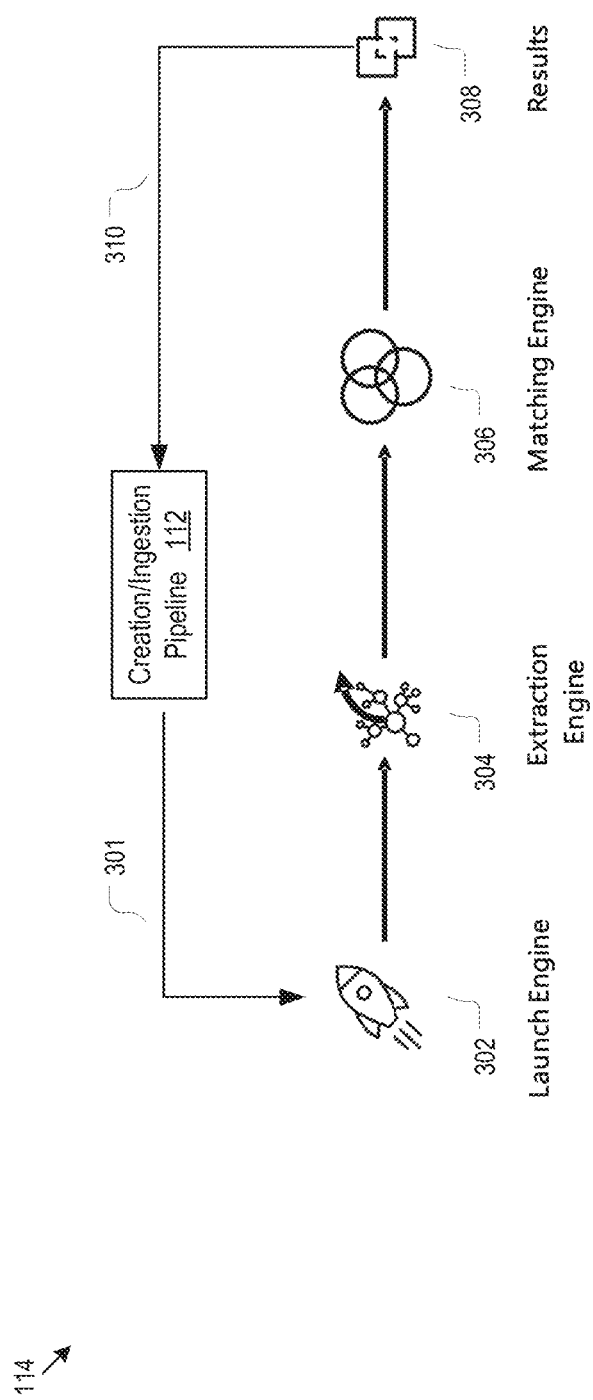
FIG. 3 shows an exemplary hydration pipeline within the agnostic knowledge graph creation and application platform of FIG. 1.

FIG. 3 illustrates an exemplary hydration pipeline 114 of FIG. 1. The hydration pipeline 114 may be configured to launch the materialized schema generated for a particular vendor solution space (as shown by arrow 301) into the vendor solution and tracking any changes of the knowledge graph made by in the vendor solution space for version control. The hydration pipeline 114, for example, may include a launch engine 302 as an orchestrator for automatically ingesting the materialized schema into a knowledge graph representation in the vendor solution space.

The hydration pipeline 114 may further include an extraction engine 304 that interfaces with the vendor solution space for pulling out or back-extracting the knowledge graph in the vendor solution space into the AKGC&A platform 110 in an agnostic internal format. The purpose for such back-extraction is to track changes that may have been made to the schema and knowledge graph in the vendor solution space after launching. For example, changes to the schema/knowledge graph made in the vendor solution space after launching by the launching engine 302 may include addition of data entities/relationships, modification of the schema, and import of other graphs from other sources. As the AKGC&A platform 110 may be used as a plugin in the vendor solution space, these changes above after launching may be made via other platforms and these changes and the lineage of the schema may only be tracked via the back-extraction by the extraction engine 304 in the AKGC&A platform 110.

These changes may be tracked by comparing the agnostic version of the graph and schema back-extracted from the vendor solution space to what the AKGC&A had maintained in the past (e.g., prior to launching). Such comparison may be made by a matching engine 306 within the hydration pipeline 114. For example, the matching engine 306 may identify subgraphs from the knowledge graph extracted from the vendor solution space and further identify alignment (overlap) or misalignment (differences) between the subgraphs and segmented namespaces in the namespace repository. As described in further detail below in relation to FIG. 7, the detected difference (results) 308 by the matching engine 306 may be used as the basis for versioning of the namespaces stored in the namespace repository, as shown by arrow 310 which indicates a feedback of the difference 308 to the namespace repository 202 of the creation/ingestion pipeline 112.

The various versions of the knowledge graph together with the changes that may be derived by the hydration pipeline 114 may provide a basis for the contextual view and query of the knowledge graph by users of the AKGC&A platform as described further below. In addition, through such contextual view of evolvement of the various versions of the knowledge graph, the users may be provided a tool for diagnose issues caused by the changes made to the knowledge graph at different times (some of which may create conflicts and breakdowns of the knowledge graph)

Figure 4:
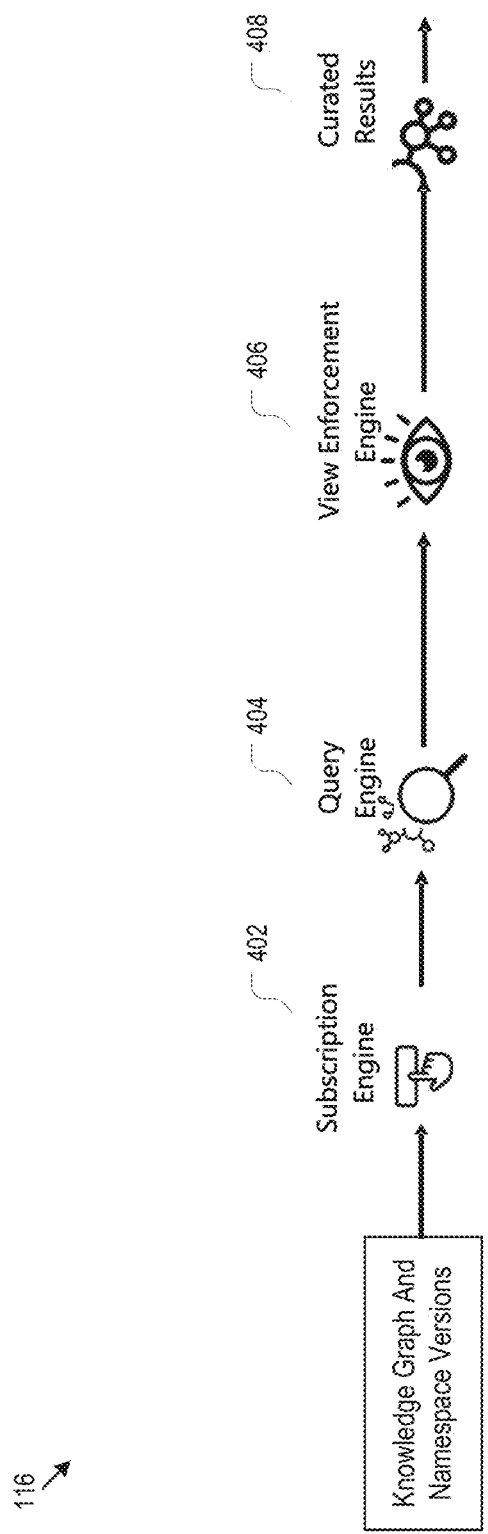
FIG. 4 shows an exemplary application pipeline within the agnostic knowledge graph creation and application platform of FIG. 1.

FIG. 4 illustrates an exemplary application pipeline 116 of FIG. 1 that may be configured to offer users a contextual data view and query of the back-extracted knowledge graph and its various versions corresponding to the versions of namespaces maintained in the namespace repository. The application pipeline 116 of FIG. 4 may provide a subscription service to users such that the versions of knowledge graphs back-extracted and monitored by the hydration pipeline 114 may be contextually viewed and queried by a user.

For example, the application pipeline 116 may include a subscription engine 402 for managing user subscriptions. A user, for example, may be subscribed to limited portions of the knowledge graph, such as a particular set of data domains and/or a particular set of versions of the knowledge graph. In addition, each user may be associated with one of a set of different predefined access privileges, and each access privilege may be associated with particular portions or versions of the knowledge graph. The subscription engine 402 may be configured to enforce such user access privileges. Such a scheme may facilitate a secure access of the knowledge graph by delineation of users into various categories or groups.

The application pipeline 116 may further include a query engine that performs a search of the knowledge graph constrained by the user subscription. This contextual search is provided within the AKGC&A platform to the users, as a plugin, for example, in addition to the viewing and querying of the current knowledge graph residing in the vendor solution space. Such contextual viewing and querying within the AKGC&A platform may be offered based on not only the current version of the knowledge graph back-extracted from the vendor solution space by the hydration pipeline 114, but also the various previous versions of the knowledge graph tracked by the hydration pipeline 114, as described above and in FIG. 7 below.

In the exemplary implementation of the application pipeline 116 in FIG. 4, in particular, entities and relationships belonging to domains that the user has not subscribed to may not be returned among the query results. In addition, the query engine may further screen data items within the different versions of the knowledge graph that are not explicitly kept away from the user according to his/her subscription but should not be provide access to the user in view of the nature of the data items and their relationship with the portions of the knowledge graph that the user is not subscribed to. Likewise, the application pipeline 116 may further include a view enforcement engine 406 to at most permit viewing by the user of portions of the knowledge graph that are subscribed to by the user. Results returned from the query engine 404 and the views formed by the view enforcement engine 406 may then be curated by the application pipeline 116 at 408 and provided to the user via the user interface on a user terminal device.

Figure 5:
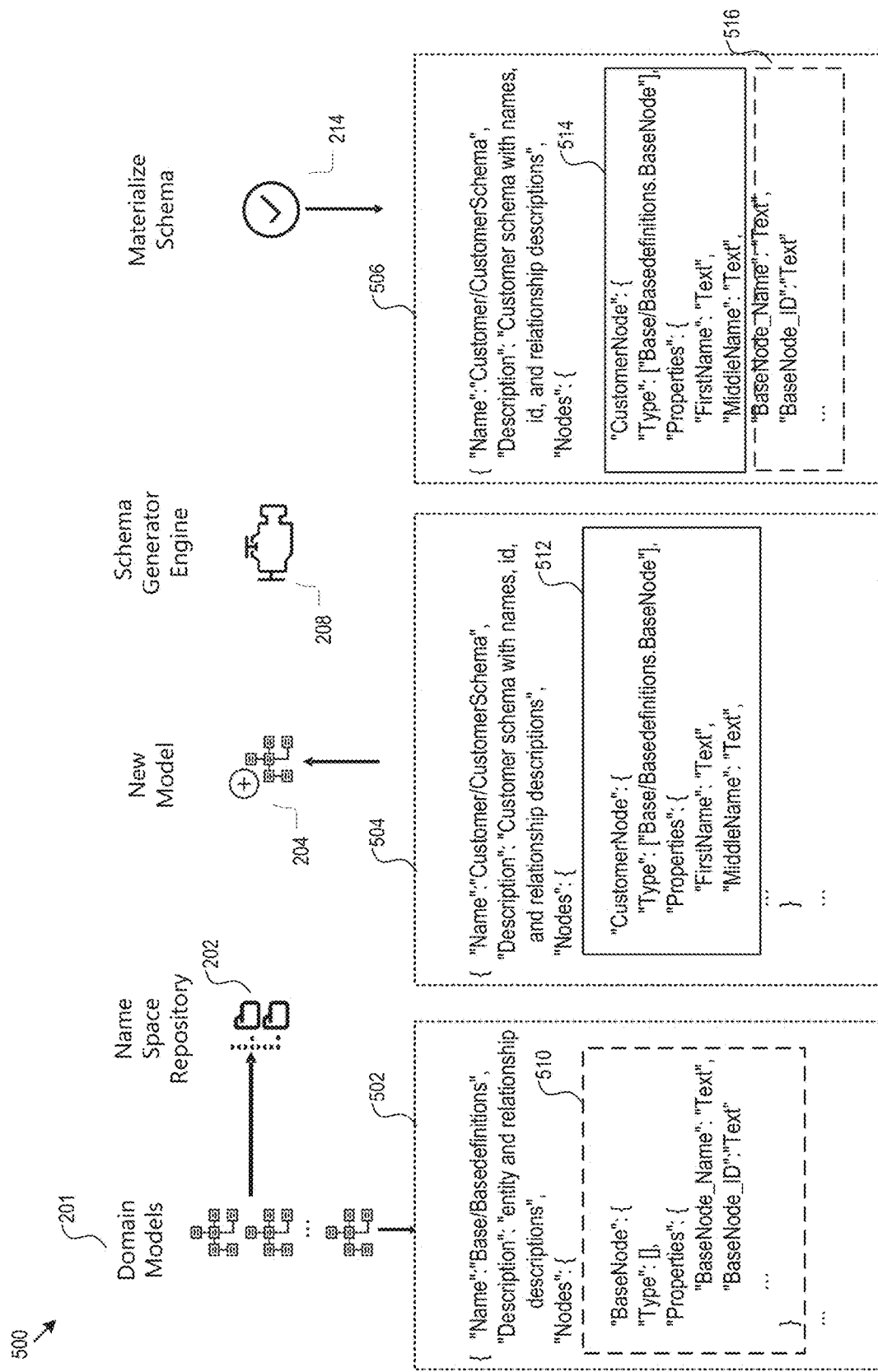
FIG. 5 illustrates a namespace inheritance function of the knowledge graph creation and application platform of FIG. 1.

FIG. 5 illustrates the namespace inheritance function 500 described above in further detail. As shown in FIG. 5, namespaces may be extracted from the domain data models 201 and imported into a new data composite model 504 to generate a new knowledge graph schema that inherits the namespaces in the domain models 201. For example, 502 shows a schema for a domain data model 201. The domain data model schema 502 specifies "BaseNode" as one of the defined types of nodes in the domain knowledge graph associated with the domain data model schema 502. As specified in 502, a "BaseNode" is associated with two properties: "BaseNode_Name" and "BaseNode_ID".

As Further shown in FIG. 5, the new composite data model 504 defines a new node "CustomerNode" that inherits properties of the "BaseNode" from the domain data model schema 502 specifying the "Type" of the "CustomerNode" as pointing to "Base/Basedefinitions.BaseNode]. The new composite data model 504 additionally includes two properties for "CustomerNode" as "FirstName" and "MiddleName". By such inheritance, the schema generator engine 208 may incorporate the domain data model schema 502 with the new composite data model 504 to generate schema 506. The schema 506 that may be used for launching the final knowledge graph may include specification of "CustomerNode" as including both the "FirstName" and "MiddleName" properties from the explicit specification in the new composite data model 504, as indicated by 514, and the "BaseNode_Name" and "BaseNode_IE" properties inherited from the domain data model schema 502, as indicated by 506.

While the namespace inherency is illustrated in FIG. 5 at a node level, such inherency may be similarly implemented in various facets or levels including nodes, edges, relationships and all the way up to inherence of entire knowledge graphs associated with the domain data models.

Figure 6:
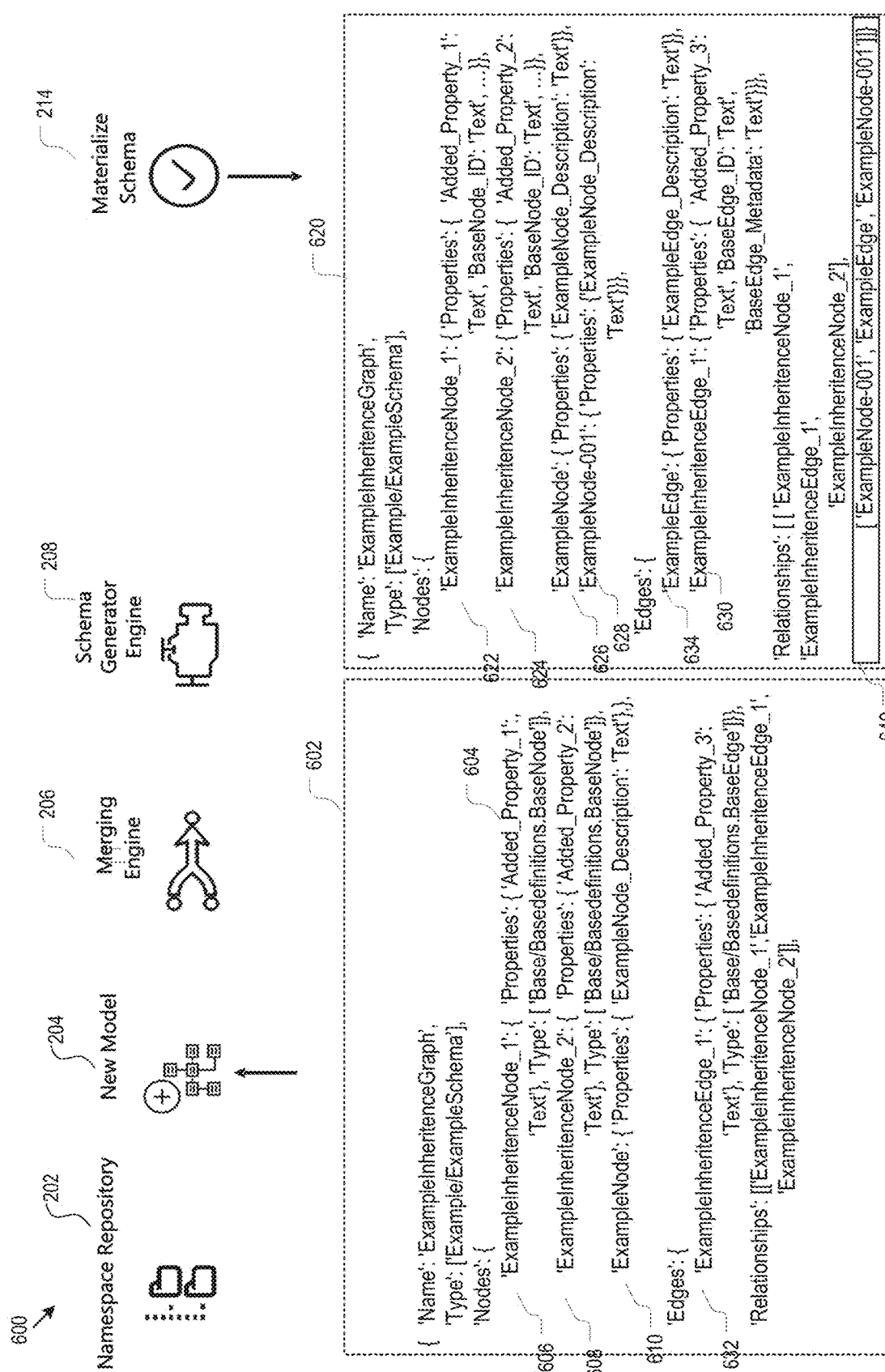
FIG. 6 illustrates a namespace and schema merging and namespace collision resolution function of the knowledge graph creation and application platform of FIG. 1.

FIG. 6 illustrates the namespace merging function 600 described above in further detail. A new model defined in 204 of the creation/ingestion pipe line is shown in 602 of FIG. 6. The new model defines several nodes of type "BaseNode", as shown by 604. As such, the "BaseNode" schema as pointed to by "Base/Basedefnition.BaseNode" may be inherited as described above in relation to FIG. 5. In the example of FIG. 6, it is assumed that the a node "ExampleNode" has been defined in the "BaseNode" schema. When nodes are defined in the new model 602, several nodes are specified, as shown by 606, 608, and 610. The nodes 606 and 608 inherit properties from "BaseNode" whereas node 610 does not contain inherency. However, node 610 has an exact same name as another node defined in the "BaseNode" schema: "ExampleNode". If the "BaseNode" schema were to be inherited in its entirety, then the node "ExampleNode" in the "BaseNode" schema would also be included among the nodes for a new schema generated by the schema generator engine 208. As such, a namespace collision may occur.

An exemplary new schema generated by the schema generator engine 208 is shown in 620 in FIG. 6. FIG. 6 shows that the nodes 606 and 608 defined from the new model 602 are incorporated into the new schema as nodes 622 and 624. In addition to the properties for these nodes explicitly defined in the new model 602 (such as "added_Property_1"), the nodes 622 and 624 further inherit properties defined for "BaseNode" in the "BaseNode" schema (such as "BaseNode_ID"). The node 610 defined in the new model 602 and a node named "ExampleNode" from the "BaseNode" schema share the same name. Such name collision may be resolved by the schema generator engine 208 during a merging process by renaming at least one of the conflicting nodes. In the exemplary new schema 620 shown in FIG. 6, the node 610 may keep its name as node 626 in the new schema 620, whereas the "ExampleNode" from the "BaseNode" schema may be renamed as "ExampleNode-001", shown as node 628 in the new schema 620. One or more rules for renaming conflicting names may be pre-defined.

Similar inheritance may be included for edges, such as edge 630 in the new schema 620 as defined as edge 632 in the new model 602. The edge 630 inherits property "BaseEdge_ID" from a "BaseEdge" schema as referenced in edge 630. In the new schema 620, edge 634 may be directly inherited from the "BaseEdge" schema and there is no namespace collision for edges.

As further shown by 640 of FIG. 6, the namespace collision resolution between nodes 626 and 628 prior to its resolution propagates to some of the relationships defined in the new schema 620. In particular, a relationship between "ExampleNodes" via "ExampleEdge" in the "BaseNode" schema is inherited into the new schema 620, with the new relation being defined between "ExampleNode-001" as a result of the namespace collision resolution above.

Figure 7:
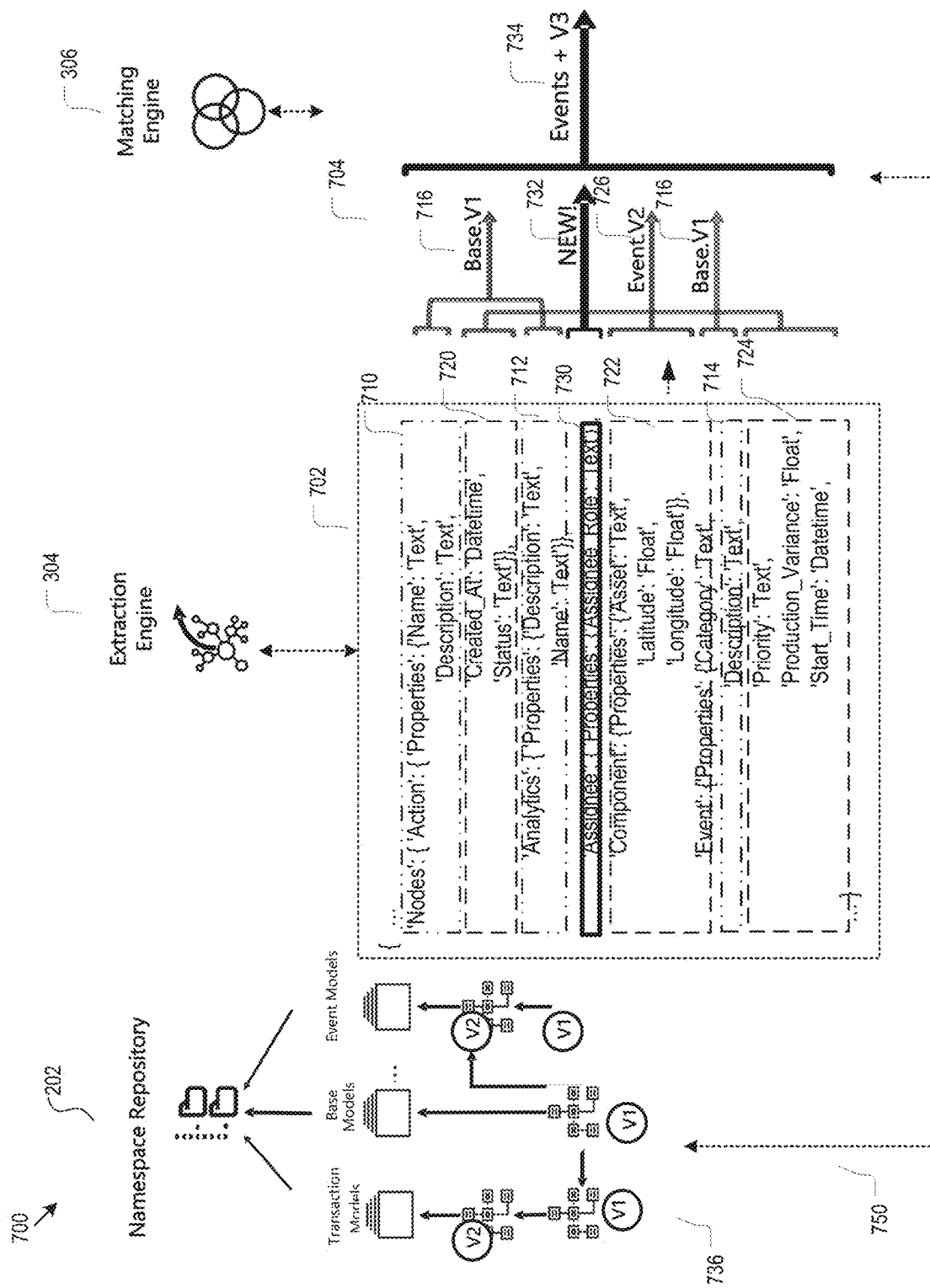
FIG. 7 illustrates a versioning function for namespace, schema, and knowledge graph in the knowledge graph creation and application platform of FIG. 1.

FIG. 7 illustrates the knowledge graph and namespace version control function 700 described above in further detail. In particular, 702 shows an excerpt of the knowledge graph launched by the hydration pipeline 114 that is back-extracted by the hydration pipeline 114 in an internally agnostic format. The excerpt 702 may include various definitions for nodes, edges, relationships, and their properties, shown as 710, 712, 714, 720, 722, 724, and 730. These segments of definitions may represent a portion of the knowledge graph and may be compared by the matching engine 306 with the various prior versions of the knowledge graph and namespaces.

An exemplary output of such matching is shown in 704. For example, The matching engine 306 may determine via the comparison that section 710 relating to the "Action" node, section 712 relating to the "Analytics" Node, and section 714 relating to the "Description" property of the "Event" node match those already existed in version-1 (V1) of one of the domain models (e.g., "Base Model"), as shown by 716. For another example, the matching engine 306 may determine via the comparison that section 720 relating to the "Created-At" and "Status" properties of the "Action" node, section 722 relating to the "Component" nodes and "Category" property of the "Event" node, Section 724 relating to the "Priority", "Production_Variance", and "Start Time" properties of the "Event" node match what existed in version-2 (V2) of one of the other domain models (e.g., "Event Model"), as shown by 726. For yet another example, the matching engine 306 may determine via the comparison that section 730 relating to node "Assignee" does not match any previous versions of the namespace and is thus a new addition to the knowledge graph, as shown by 732. As further shown by 734, the snapshot of the current version of the knowledge graph with the version information 716, 726, and 732 may then be provided to the namespace repository 202 for storage as shown by arrow 750. The relationship between different versions of namespaces and different domain models may be maintained by the namespace repository as an exemplary tree shown in 736. The namespace repository further maintain information with respects to the inherency relationship between the domain models as shown by the lateral arrows within the tree 736. The namespace repository may maintain these information such that the various versions of the namespace may be recovered and provided to the matching engine 304 for future tracking of changes in the launched knowledge graph.

As shown in FIG. 7, the changes made in the knowledge graph after launching may be tracked by the extraction engine 304 and matching engine 306 at various levels. For example, change of an entire node or an entire domain (e.g., addition, removal) may be tracked. Further, individual properties within a node may be tracked for changes.

Figure 8:
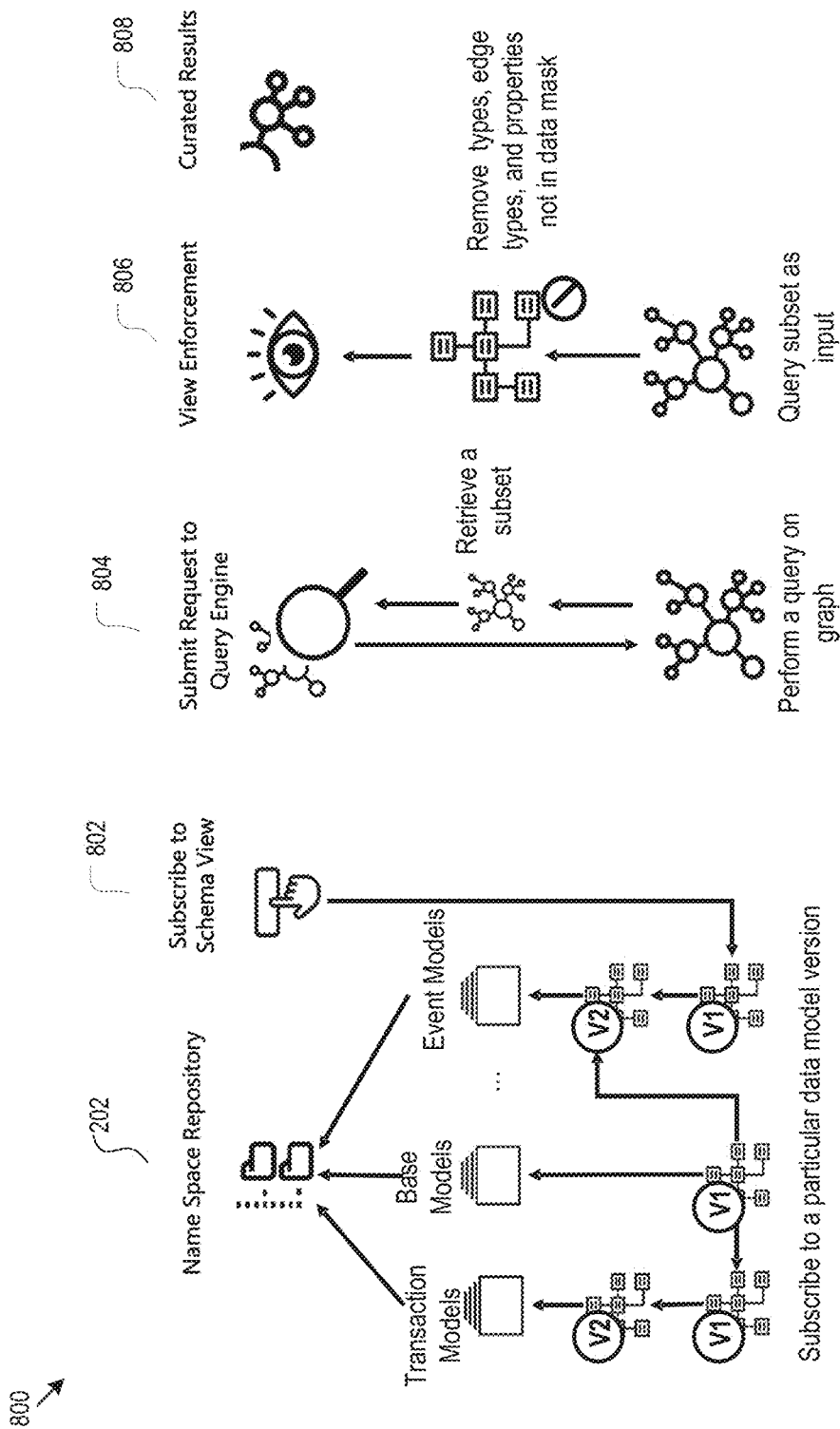
FIG. 8 illustrates a contextual view and query function of the knowledge graph creation and application platform of FIG. 1.

FIG. 8 illustrates the contextual view and query function described above in further detail. As shown by 802, a user may be provided a service for subscribing to a subset of the knowledge graph. For example, the user may subscribe to particular data domains or particular versions of the knowledge graph. As such, when a query is made by the user to the AKGC&A platform, as shown in 804, the subset of the knowledge graph may be retrieved for query to obtain query results. As further shown by 806, a data mask may be further applied to the query results by the view enforcement engine 406 of FIG. 4 to remove data within the query results that are related to the non-subscripted portions of the graph such that they should not be shown to the user for various reasons. The data mask may be further applied to remove certain types of nodes or edges, and/or certain types of properties within nodes/edges that may be subscribed but should not be included for viewing or query by nature of their relationship with the unsubscribed portions or versions of the knowledge graph. As shown in 808, the final query subset without unsubscribed portions of the knowledge graph and with the data mask applied may be curated for user view.

Figure 9:
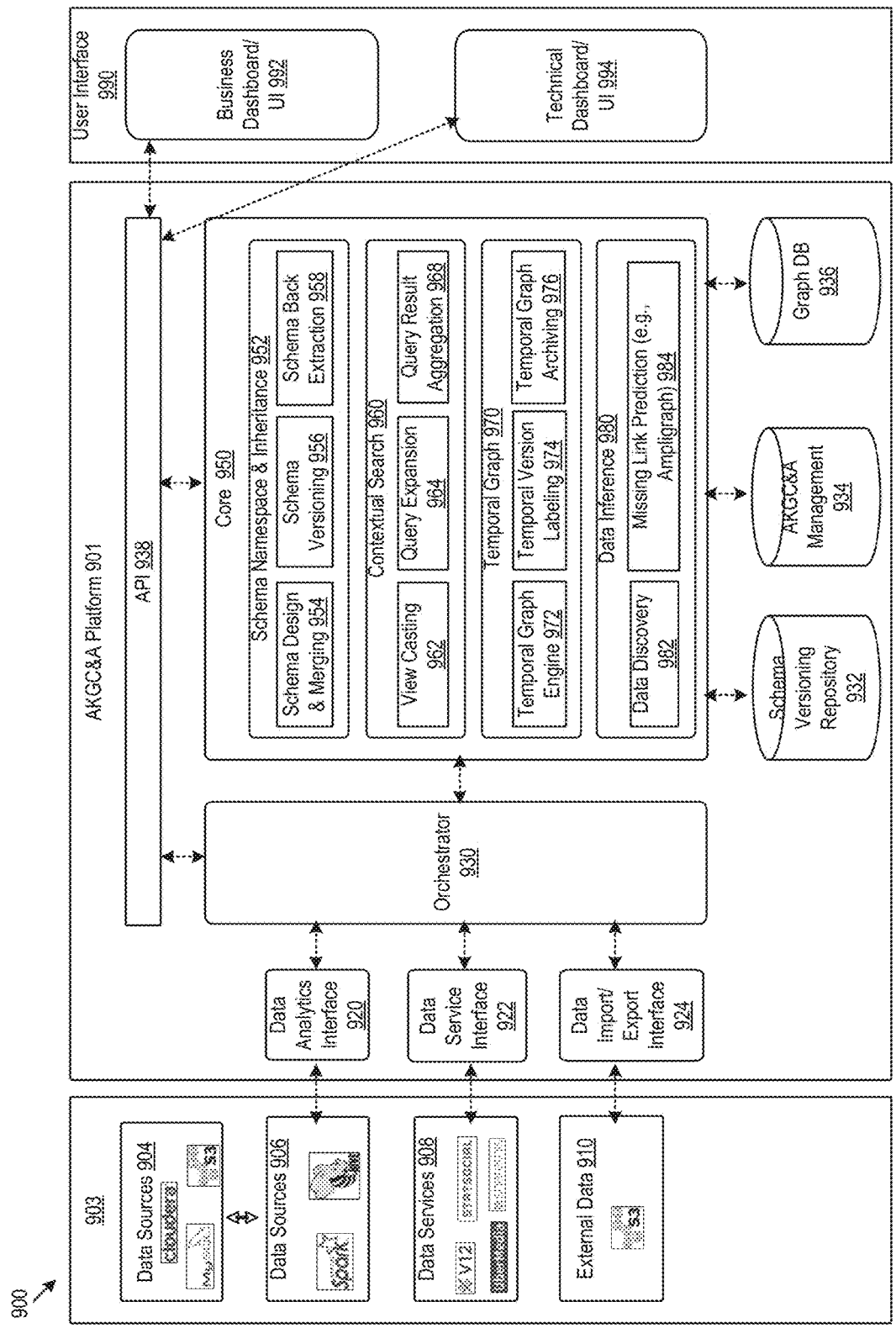
FIG. 9 shows an exemplary architectural view of a knowledge graph creation and application platform.

FIG. 9 illustrates an architectural view 900 of the AKGC&A platform 901 with the functions described above and with some additional functionalities. The AKGC&A platform 901 may be implemented as a plugin to a vendor knowledge graph solution space. As shown in FIG. 9, the AKGC&A platform 901 may extract information from various existing knowledge sources 903 for the creation of a merged schema for a new knowledge graph. These knowledge sources is a broader equivalent of the various domain models of FIGS. 1 and 2. These knowledge sources may come from within or external to the AKGC&A platform 901. For example, the AKGC&A platform 901 may internally maintain expert validated domain models and other types of knowledge as sources for the creation of new schemas. Likewise, these knowledge sources 903 may come from within or external to the vendor solution space. The knowledge sources may include knowledge of various forms, including validated domain models, existing knowledge graphs, and other knowledge bases, as shown by 904, 906, 908, and 910. Information (such as namespaces described above) may be extracted from these knowledge sources by the AKGC&A platform 901 via its data analytics interface 902, data service interface 922 and data export/import interface 924. Reversely, the AKGC&A platform 901 may also output data to these knowledge sources.

FIG. 9 further shows that the AKGC&A platform 901 includes a data orchestrator 930 that interfaces between extraction from knowledge sources and the various functionality of the AKGC&A platform 901. The AKGC&A platform 901 further includes a core 950 for implementing the various functionalities of the AKGC&A platform 901. For example, the core 950 may include schema namespace and inheritance functions 952, contextual search functions 960, temporal graph functions 970, and data inference functions 980. The schema namespace and inheritance functions 952 provide some of the components used in the creation/ingestion pipeline 112 and the hydration pipeline 114 of FIGS. 1-3, including for example, schema design and merging function 954, schema versioning function 956, and schema back-extraction function 958 described above. The contextual search functions 960 may provide some of the components used in the application pipeline 116 in FIGS. 1 and 4, including for example, view casting function 962, query expansion function 964 and query result aggregation function 968. The temporal graph functions 970 may provide components for temporal versioning of the knowledge graph, including for example, temporal graph engine 972, temporal version labeling function 974, and temporal graph archiving function 976. The data inference functions 980 may provide intelligence to the AKGC&A platform 901, including for example, data recovery functions 982 and missing link prediction function 984 based on, e.g., ampli-graph technologies. The data inference functions 980 may be used by the matching engine 306 of FIGS. 3 and 7.

The AKGC&A platform 901 may further include various data stores for accomplishing the functions above. For example, it may include a schema versioning repository 932 which may encompass the namespace repository of FIG. 1. It may further include a graph database for storing nodes, edges, relationships and their properties. A data store 934 may be included for keeping track of initial, intermediate, and final data that may be generated by the AKGC&A platform.

The AKGC&A platform 901 of FIG. 9 may provide various APIs 938 that may be used for enabling access to the various functionalities of the AKGC&A platform via user interfaces 990. The user interfaces 990 may include operation dashboard 992 for operators of the AKGC&A platform and technical dashboard 994 for other users such as domain experts.

Figure 10:
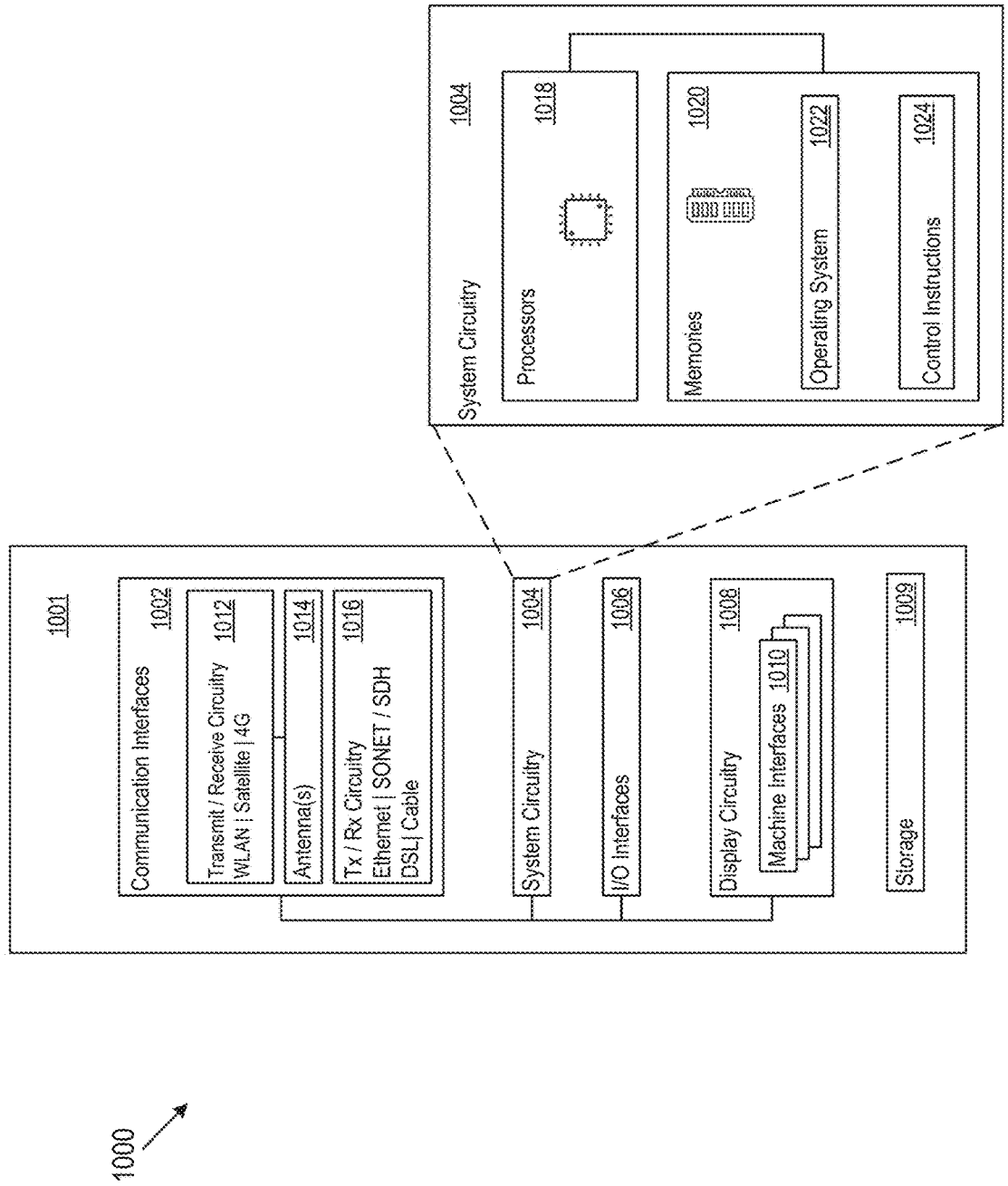
FIG. 10 shows components of an exemplary computing device that may be used to implement various functions of a knowledge graph creation and application platform.

Finally, FIG. 10 shows an exemplary computer device 1000 that may be used as various computing components in the AKGC&A platform described above. The computer device 1000 may include circuits 1001 that includes communication interfaces 1002, system circuitry 1004, input/output (I/O) interfaces 1006, storage 1009, and display circuitry 1008 that generates machine interfaces 1010 locally or for remote display, e.g., in a web browser running on a local or remote machine. The machine interfaces 1010 and the I/O interfaces 1006 may include GUIs, touch sensitive displays, voice or facial recognition inputs, buttons, switches, speakers and other user interface elements. Additional examples of the I/O interfaces 1006 include microphones, video and still image cameras, headset and microphone input/output jacks, Universal Serial Bus (USB) connectors, memory card slots, and other types of inputs. The I/O interfaces 1006 may further include magnetic or optical media interfaces (e.g., a CDROM or DVD drive), serial and parallel bus interfaces, and keyboard and mouse interfaces.

The communication interfaces 1002 may include wireless transmitters and receivers ("transceivers") 1012 and any antennas 1014 used by the transmitting and receiving circuitry of the transceivers 1012. The transceivers 1012 and antennas 1014 may support Wi-Fi network communications, for instance, under any version of IEEE 802.11, e.g., 802.11n or 802.11ac. The communication interfaces 1002 may also include wireline transceivers 1016. The wireline transceivers 1016 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 1009 may be used to store various initial, intermediate, or final data or model for building, updating, and operating the AKGC&A platform. The system circuitry 1004 may include hardware, software, firmware, or other circuitry in any combination. The system circuitry 1004 may be implemented, for example, with one or more systems on a chip (SoC), application specific integrated circuits (ASIC), microprocessors, discrete analog and digital circuits, and other circuitry. The system circuitry 1004 is part of the implementation of any desired functionality related to the building, maintenance, and application of the customized graph knowledge base. As just one example, the system circuitry 1004 may include one or more instruction processors 1018 and memories 1020. The memories 1020 stores, for example, control instructions 1024 and an operating system 1022. In one implementation, the instruction processors 1018 executes the control instructions 1024 and the operating system 1022 to carry out any desired functionality related to the customized graph knowledge base.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible. For example, the example implementations included within the drawing sheets are described to be illustrative of various ones of the principles discussed above. However, the examples included within the drawing sheets are not intended to be limiting, but rather, in some cases, other examples to aid in the illustration of the above described techniques and architectures fall within the scope of this disclosure.

What is claimed is:

1. A method including:
   automatically extracting a first namespace from a first data model and a second namespace from a second data model independent of the first data model;
   recording the first namespace and the second namespace in a namespace repository;
   generating a composite data model dependent on the first namespace and the second namespace and including new concepts and relationships generated using a machine learning algorithm based on the first namespace and second name space;

automatically generating an agnostic merged schema merging the first namespace and the second namespace and combining the new concepts and relationships, the agnostic merged schema being generated in a format independent of data models;

automatically ingesting a composite knowledge graph based on the agnostic merged schema and the composite data model;

automatically back-extracting different versions of the composite knowledge graph at different times as the composite knowledge graph is modified after ingestion;

automatically determining changes made in the different versions of the composite knowledge graph at the different times;

automatically extracting and generating different versions of the first namespace and the second namespace at the different times corresponding to the different versions of the composite knowledge graph based on the changes in the composite knowledge graph; and tracking the different versions of the first namespace and the second namespace in the namespace repository.

2. The method of claim 1, wherein the first data model comprises a first schema associated with a first knowledge graph and a second schema associated with a second knowledge graph independent of the first knowledge graph.

3. The method of claim 2, wherein the first schema associated with the first knowledge graph and the second schema associated with the second knowledge graph are expressed using a first graphic data description framework and a second graphic description framework distinct from the first graphic data description framework.

4. The method of claim 1, wherein the first data model and the second data model belong to a model library containing a plurality of pre-validated domain data models.

5. The method of claim 1, wherein the composite data model inherits at least a portion of the first namespace and the second namespace.

6. The method of claim 5, wherein the composite data model comprises definitions of graph nodes, graph edges, or relationships between the graph nodes.

7. The method of claim 5, wherein:
the composite data model comprises a definition of a graph node based on the first namespace; and
the definition of the graph node comprises a property definition inherited from the second namespace.

8. The method of claim 1, wherein automatically generating the agnostic merged schema merging the first namespace and the second namespace comprises:
determining a plurality of graph nodes or graph edges based on the composite data model and the first namespace and the second namespace;
identifying a namespace collision between a first graph node and a second graph node among the plurality of graph nodes;
resolving the namespace collision by automatically renaming the second graph node according to a predefined naming rule; and
including definitions of the plurality of graph nodes in the agnostic merged schema with the second graph node renamed.

9. The method of claim 8, wherein generating the agnostic merged schema merging first namespace and the second namespace further comprises:
determining a plurality of graph relationships between the plurality of graph nodes;

modifying the plurality of graph relationships according to the renamed second graph node; and
including definitions of the modified plurality of the graph relationships in the agnostic merged schema.

10. The method of claim 1, further comprising providing a contextual service for viewing and querying the composite knowledge graph to a user.

11. The method of claim 10, wherein the contextual service for viewing and querying the composite knowledge graph is based on a user service subscription.

12. The method of claim 11, wherein the user service subscription comprises a subscription to selected portions and/or selected versions of the composite knowledge graph.

13. The method of claim 12, wherein the selected portions of the composite knowledge graph correspond to one of the first data model and the second data model.

14. The method of claim 12, further comprising receiving a query from the user;
searching a subset of the composite knowledge graph determine by the user service subscription to obtain a query result; and
curating a view of the query result to the user via a user interface on a user terminal device.

15. The method of claim 1, wherein automatically ingesting the composite knowledge graph based on the agnostic merged schema comprises:
automatically converting the agnostic merged schema into a converted schema of a predefined graphic data description framework; and
automatically ingesting the composite knowledge graph according to the converted schema.

16. The method of claim 15, wherein:
the automatically back-extracting the different versions of the composite knowledge graph, automatically determining changes made in the different versions of the composite knowledge graph, and automatically extracting and generating different versions of the first namespace and the second namespace are performed in a manner agnostic to the predefined graphic data description framework.

17. A computer system comprising memories for storing computer instructions and processors, where the processors are configured to execute the computer instructions to:
automatically extract a first namespace from a first data model and a second namespace from a second data model independent of the first data model;
record the first namespace and the second namespace in a namespace repository;
generate a composite data model dependent of the first namespace and the second namespace and including new concepts and relationships generated using a machine learning algorithm based on the first namespace and second name space;
automatically generate an agnostic merged schema merging the first namespace and the second namespace and combining the new concepts and relationships, the agnostic merged schema being generated in a format independent of data models;
automatically ingest a composite knowledge graph based on the agnostic merged schema and the composite data model;
automatically back-extract different versions of the composite knowledge graph at different times as the composite knowledge graph is modified after ingestion;
automatically determine changes made in the different versions of the composite knowledge graph at the different times;

automatically extract and generate different versions of the first namespace and the second namespace at the different times corresponding to the different versions of the composite knowledge graph based on the changes in the composite knowledge graph; and track the different versions of the first namespace and the second namespace in the namespace repository.

18. The computer system of claim 17, wherein to automatically generate the agnostic merged schema merging the first namespace and the second namespace, the processors are configured to execute the computer instructions to:

determine a plurality of graph nodes or graph edges based on the composite data model and the first namespace and the second namespace;

identify a namespace collision between a first graph node and a second graph node among the plurality of graph nodes;

resolve the namespace collision by automatically renaming the second graph node according to a predefined naming rule; and include definitions of the plurality of graph nodes in the agnostic merged schema with the second graph node renamed.

19. The computer system of claim 17, wherein to automatically ingest the composite knowledge graph based on the agnostic merged schema, the processors are configured to execute the computer instructions to:

automatically convert the agnostic merged schema into a converted schema of a predefined graphic data description framework; and automatically launch the composite knowledge graph according to the converted schema.

20. A non-transitory computer readable medium for storing computer instructions, wherein the computer instructions, when executed by computer processors, are configured to cause the computer processors to:

automatically extract a first namespace from a first data model and a second namespace from a second data model independent of the first data model;

record the first namespace and the second namespace in a namespace repository;

generate a composite data model dependent of the first namespace and the second namespace and including new concepts and relationships generated using a machine learning algorithm based on the first namespace and second name space;

automatically generate an agnostic merged schema merging the first namespace and the second namespace and combining the new concepts and relationships, the agnostic merged schema being generated in a format independent of data models;

automatically ingest a composite knowledge graph based on the agnostic merged schema and the composite data model;

automatically back-extract different versions of the composite knowledge graph at different times as the composite knowledge graph is modified after ingestion;

automatically determine changes made in the different versions of the composite knowledge graph at the different times;

automatically extract and generate different versions of the first namespace and the second namespace at the different times corresponding to the different versions of the composite knowledge graph based on the changes in the composite knowledge graph; and track the different versions of the first namespace and the second namespace in the namespace repository.

* * * * *